United States Patent [19]

Schmidt

[11] Patent Number: 4,649,510
[45] Date of Patent: Mar. 10, 1987

[54] METHODS AND APPARATUS FOR THE PROTECTION AND CONTROL OF COMPUTER PROGRAMS

[76] Inventor: Walter E. Schmidt, 604 W. 115th St., Apt. B, New York, N.Y. 10025

[21] Appl. No.: 373,668

[22] Filed: Apr. 30, 1982

[51] Int. Cl.⁴ .................................................. G06F 9/00
[52] U.S. Cl. .................................................. 364/900
[58] Field of Search ...................... 364/200, 900; 178/22.02, 22.06

[56] References Cited

U.S. PATENT DOCUMENTS

| | | | |
|---|---|---|---|
| 3,798,359 | 3/1974 | Feistel | 178/22 |
| 3,906,460 | 9/1975 | Halpern | 340/172.5 |
| 3,909,795 | 9/1975 | Chang et al. | 340/172.5 |
| 3,911,216 | 10/1975 | Bartek et al. | 178/22 |
| 3,958,081 | 5/1976 | Ehrsam et al. | 178/22 |
| 3,978,454 | 8/1976 | Willard | 340/172.5 |
| 4,028,683 | 6/1977 | Divine et al. | 364/900 |
| 4,038,596 | 7/1977 | Lee | 324/34 R |
| 4,070,702 | 1/1978 | Grants et al. | 364/200 |
| 4,107,458 | 8/1978 | Constant | 178/22 |
| 4,118,789 | 10/1978 | Casto et al. | 364/900 |
| 4,120,030 | 10/1978 | Johnstone | 364/200 |
| 4,122,519 | 10/1978 | Bielawski et al. | 364/200 |
| 4,157,454 | 5/1979 | Becker | 178/22 |
| 4,168,396 | 9/1979 | Best | 178/22 |
| 4,278,837 | 7/1981 | Best | 178/22.09 |
| 4,296,475 | 10/1981 | Nederlof et al. | 364/900 |
| 4,327,410 | 4/1982 | Patel et al. | 364/200 |

OTHER PUBLICATIONS

Principles of Digital Computer Design Meltzer et al., Prentice Hall.
System Programming Donovan, McGraw-Hill.

Primary Examiner—Thomas M. Heckler
Assistant Examiner—John G. Mills
Attorney, Agent, or Firm—Schapp and Hatch

[57] ABSTRACT

Methods and apparatus for the protection and control of computer programs wherein a valid program is modified to provide a furnished program and a corresponding restoration program, one or both of these are modified in accordance with confirmation data, and the furnished program, confirmation data, and restoration program data are supplied to an equipped computer installation in the form of a furnished program medium, a confirmation unit, and a restoration unit, via separate commercial channels.

5 Claims, 4 Drawing Figures

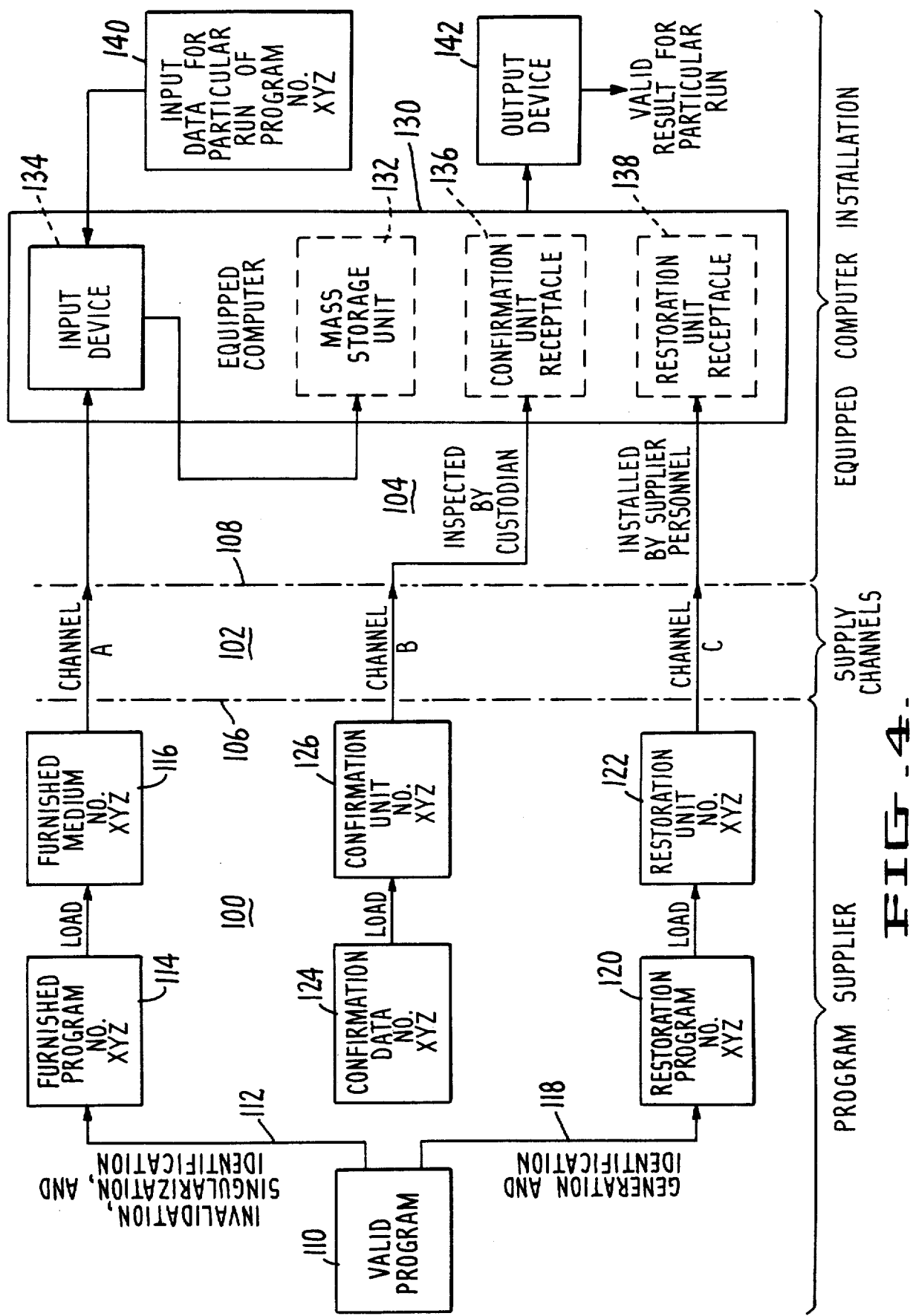

METHODS AND APPARATUS FOR THE PROTECTION AND CONTROL OF COMPUTER PROGRAMS

BACKGROUND OF THE INVENTION

1. Field of the Invention.

My invention relates to methods and apparatus for the protection and control of computer programs, and more particularly to non-cryptographic methods and apparatus for the protection and control of computer programs.

2. Description of the Prior Art.

The term "prior art" as used herein or in any statement made by or for applicant means *only* that any document or thing referred to as prior art bears or might be contended to bear, directly or inferentially, a date which is earlier than the effective filing date hereof. It is believed that the documents listed immediately below contain information which is or might be considered to be material to the examination of this patent application, since they were discovered by two independently made preliminary patentability searches.

U.S. Pat. No. 3,798,359
U.S. Pat. No. 3,906,460
U.S. Pat. No. 3,909,795
U.S. Pat. No. 3,911,216
U.S. Pat. No. 3,958,081
U.S. Pat. No. 3,978,454
U.S. Pat. No. 4,038,596
U.S. Pat. No. 4,070,702
U.S. Pat. No. 4,107,458
U.S. Pat. No. 4,120,030
U.S. Pat. No. 4,122,519
U.S. Pat. No. 4,157,454
U.S. Pat. No. 4,158,396
U.S. Pat. No. 4,188,789
U.S. Pat. No. 4,278,037.

No representation is made herein that no more pertinent information exists.

Methods and apparatus for the protection and control of computer programs are to be found in the prior art.

Many of the prior art methods and apparatus for the protection and control of computer programs are cryptographic in character, relying upon the encryption of the programs to be protected or controlled or parts thereof, and thus necessitating the incorporation of decrypting means, i.e., special circuits and/or programs and data, into each computer in which such an encrypted program is to be run.

Thus, even the simplest of these prior art cryptographic systems involve considerable cost, both for the encryption of the programs and for the modification of the associated computers to decrypt the encrypted programs. Further, the encryption and decryption of the programs of these systems necessarily produces additional possibilities of error and difficulties in the servicing of the computers thereof.

Non-cryptographic arrangements for the protection of computer-controlled communications and industrial processing equipment against erroneous modifications of their control programs are also known in the prior art, but the operating principles of these arrangements are either inapplicable to general purpose digital computers and their programs or do not appear to have been applied thereto.

SUMMARY OF THE INVENTION

Accordingly, it is an object of my invention to provide non-cryptographic methods and apparatus for the protection and control of programs for general purpose digital computers, i.e., digital computers which are not dedicated to particular applications in industrial process control or communications.

Another object of my invention is to provide methods and apparatus for the protection and control of computer programs which are compatible with the running of unprotected programs on the same computers, without modification.

Yet another object of my invention is to provide methods and apparatus for the protection and control of computer programs to which virtually any existing digital computer may be easily adapted by retrofitting.

A further object of my invention is to provide methods and apparatus for the protection and control of computer programs which do not involve the redesign of any basic computer units, or new approaches to the design of basic computer units, but rather involve only the addition to pre-existing computer designs of new and separate units which can be simply and directly connected to the busses of those designs without substantial changes in timing or internal data and instruction handling.

It is a yet further object of my invention to provide methods and apparatus for the protection and control of computer programs which can be adapted to existing, newly designed, or future computers without substantially impairing their operating speeds or other aspects of their functioning.

It is an additional object of my invention to provide methods and apparatus for the protection and control of computer programs which can in some instances increase the speed of operation of the computers to which they are adapted.

It is another object of my invention to provide methods and apparatus for the protection and control of computer programs which include means whereby the protected and controlled programs can only be run on predesignated computers, at predetermined times, on predetermined dates, and/or in the presence or with the consent of predesignated individuals.

It is yet another object of my invention to provide methods and apparatus for the protection and control of computer programs in which at least some of the units added to a computer to adapt it for such protection and control are rendered ineffective or completely destroyed if they are tampered with in an attempt to misappropriate a protected program.

Other objects of my invention will in part be obvious and will in part appear hereinafter.

My invention, accordingly, comprises the several steps and the relations of one or more of such steps with respect to each of the others, and the apparatus embodying features of construction, combinations of elements, and arrangements of parts which are adapted to effect such steps, all as exemplified in the following disclosure, and the scope of my invention will be delineated in the appended claims.

Glossary. It is believed that the following definitions will be helpful to those having ordinary skill in the art in obtaining a full appreciation of the several features and aspects of my invention pointed out hereinbelow.

The term "abridge" is used herein in its sense which is substantially synonymous with the word curtail, meaning to make cuts or deletions which impair completeness.

The term "active restoration unit" as used herein denotes a restoration unit which is itself capable of executing one or more routines of a valid computer program, which routine or routines have been deleted from said valid program in creating the systematically invalidated program which is furnished to the computer equipped with that restoration unit.

The term "augmented program" as used herein denotes an invalidated program which comprises one or more instructions added to the corresponding valid program to invalidate it.

The term "computer" as used herein embraces both large scale digital computers, e.g., mainframes, and small scale digital computers, e.g., microcomputers.

The term "confirmation unit" as used herein denotes a unit added to a computer equipped with a restoration unit of the present invention which serves to confirm that certain prescribed preconditions exist before that restoration unit can be used to restore an inputted invalidated program to a corresponding valid form and may serve to destroy or otherwise incapacitate the restoration unit if an attempt is made to run that particular invalidated program in that particular computer when said prescribed preconditions do not exist or have not been met, or may bring about the production of spurious output data if an attempt is made to run that particular invalidated program in that particular computer when said prescribed preconditions do not exist or have not been met. It is to be understood as part of my invention, however, that in certain embodiments thereof the confirmation unit will cause the equipped computer to produce false results when an invalidated program is inputted thereto and the corresponding prescribed preconditions do not exist, rather than destroying or otherwise incapacitating the restoration unit of the equipped computer. It is also to be understood that in certain embodiments of my invention the data necessary for confirmation, sometimes called the "confirmation code", is manually entered by means of the equipped computer terminal keyboard, rather than being entered by means of a custom made physical device, i.e., confirmation unit, which contains a machine readable representation of the confirmation code.

The term "data supply instruction" or "data call" as used herein denotes an instruction emitted by an active restoration unit which causes the computer equipped therewith to supply thereto data necessary for correctly executing a routine deleted from the corresponding valid program and stored in that active restoration unit.

The term "diminished program" as used herein denotes an invalidated program which is lacking a withheld element or withheld elements of the corresponding valid program.

The term "element" as used herein with respect to a computer program denotes any part of that program, however small. E.g., an element of a computer program may be a single bit of the machine language expression thereof. E.g., an element of a computer program may be a complete library subprogram.

The term "equipped computer" as used herein denotes a computer which is equipped with a restoration unit, and sometimes with one or more additional units, e.g., confirmation units, of my invention, such that it is adapted to run at least one corresponding furnished, invalidated program.

The term "furnished program" as used herein denotes a systematically invalidated computer program which is or is to be furnished to a user of a computer equipped with a restoration unit embodying my invention, e.g., pursuant to a contract of lease or sale, which restoration unit contains at least part of the specific restoration program or procedure for restoring the furnished program to its original, valid form within the computer.

The term "host computer" as used herein is synonymous with the term "equipped computer" herein.

The term "hybrid program" or "hybrid-invalidated program" is used herein to denote an invalidated program which was invalidated by a plurality of invalidation methods, e.g., diminution and permutation, or augmentation, diminution, and permutation.

The term "incompatible" is used herein in its ordinary acceptation to mean incapable of entering into the same system, theory of practice; incapable of harmonious association or of acting in accord.

The term "interrupt instruction" as used herein denotes an instruction emitted by a restoration unit or included in the corresponding furnished program which causes the corresponding, equipped computer to delay its pending operations (if any) to allow the restoration unit to inject an instruction or instructions or other data into the control unit.

The term "invalidated" is used herein in one of its common acceptations to denote something which has been rendered invalid, i.e., inefficacious, ineffective, or incapable of accomplishing what it is intended to accomplish.

Thus, the term "invalidated program" as used herein denotes an originally valid computer program which has been so modified as to render it invalid.

The term "invalidator" as used herein denotes an instruction or routine which is added to a computer program to systematically invalidate it.

Where the context so requires or admits, the term "part", as used herein, embraces the term "whole", in the manner well known in set theory and systematic logic.

The term "passive restoration unit" as used herein denotes a restoration unit which is not capable of executing a routine of a valid program, but rather is capable only of supplying data and/or instructions to the central processing unit of the computer which is equipped with that restoration unit.

The term "permuted program" is used herein to denote an invalidated program which was invalidated by the displacement of one or more of its elements.

The term "plain" is used here in its common acceptation in the cryptographic arts to mean unencrypted.

The term "plain language" as used herein with reference to a particular program, whether valid or invalidated, denotes the fact that that program is expressed in a common programming language, usually the programming language which is the source language of the compiler of the computer on which that program is intended to be run or in which that program will be restored during the running of the corresponding invalidated program.

The term "program" is used herein in its broadest acceptation as embracing but not limited to all computer programs, whether valid or invalid, and all related collections of computer program instructions or routines, whether or not all of the members of such a collection are arranged to be run on a computer seriatim to accomplish a single result.

The term "program" as used herein also embraces items of data which are part of or are to be operated upon by a computer program.

The term "pseudoprogram" will sometimes be used herein to denote an invalidated program, because, in accordance with the principles of my invention, the invalidated program will be expressed in the same programming language as the corresponding valid program, and thus may be regarded in some sense as a falsified version of the original, valid program.

The term "restoration arithmetic and logic unit" or "RALU" as used herein denotes a computer arithmetic and logic unit which is a part of a restoration unit, wherefrom it will be evident to those having ordinary skill in the art, informed by the present disclosure, that certain restoration units according to my invention are themselves dedicated computers.

The term "restoration control unit" or "RCU" as used herein denotes a computer control unit which is a part of a restoration unit, wherefrom it will be evident to those having ordinary skill in the art, informed by the present disclosure, that certain restoration units according to my invention are themselves dedicated computers.

The term "restoration library address" as used herein denotes the address of a particular instruction or step of a restoration program or procedure as found in a particular restoration library unit.

The term "restoration library unit" as used herein denotes a restoration unit, q.v., which contains the instructions or steps of more than one restoration program or procedure. The term "restoration library", accordingly, denotes herein the contents of a restoration library unit.

The term "restoration memory unit" or "RMU" as used herein denotes a memory unit which is a part of a restoration unit.

The term "restoration program" as used herein denotes a program or procedure for restoring an invalidated program to its original, valid form.

The term "restoration program segment" or "restoration subprogram" as used herein denotes a part of a restoration program which is activated by a single restoration instruction.

The term "restoration timing unit" or "RTU" as used herein denotes a timing unit for the timing of the operations of a restoration unit, which may include synchronizing means for synchronizing itself with the clock pulses of the supplied computer.

The term "restoration unit" as used herein denotes a unit added to a programmable digital computer which is capable of supplying the necessary data and directing the operation of that computer to restore an invalidated program to its original, valid form while running that valid program. Such an original, valid program reconstructed seriatim or instruction-by-instruction within a computer equipped with the correct restoration unit, will be called a "restored program" herein.

The term "restore" is used herein in one of its common acceptations as meaning "to put back into or bring back into a former or original state".

More particularly, the term "restore" as applied to an invalidated program herein means to put back or bring back that program to its original, valid state or form, or to reconstruct the corresponding original, valid program from the invalidated program and the contents or certain selected contents of the restoration unit, q.v., supra, of the unique computer which is adapted to successfully run the invalidated program by reason of incorporation in it of a corresponding restoration unit.

The term "restore instruction" or "restoration instruction" as used herein denotes an instruction contained in a furnished program which, when the furnished program is run on the computer to which it is furnished, causes the restoration unit of that computer to carry out the corresponding part of the restoration program or procedure for that furnished program. In many embodiments of my invention at least some of the restoration instructions will include restoration library addresses. In some embodiments of my invention the operating program of the computer is so designed as to cause the control unit to be nonresponsive to any restore instruction.

The term "revalidated" will sometimes be used herein as synonymous with the term "restored", as applied herein to an invalidated program or programs.

The term "revalidator" as used herein denotes an instruction or routine which may be inserted into a restored program by a restoration unit to cancel the invalidating effect of a preceding invalidator.

The term "routine" is used herein in its broadest acceptation to denote any related set of one or more instructions. Thus, the term "routine" as used herein generically embraces the term "subroutine" as a particular type of routine, and also generically embraces the term "instruction".

The term "run" is used herein to denote the running of a systematically invalidated program on a computer embodying my invention, although, as will be made apparent herein to those having ordinary skill in the art, the result will be that of running the corresponding valid program on a computer not embodying my invention.

The term "singulatization" as used herein denotes the process of so modifying a particular systematically invalidated program, which is intended to be supplied to a particular computer embodying my invention, as to render it unique, i.e., different from all of the versions of that same systematically invalidated program which are to be supplied to other computers embodying my invention.

The term "supplied computer" as used herein denotes a computer to which a furnished program, q.v., is furnished.

The term "suppressor" as used herein denotes an instruction which causes a computer embodying my invention to make no response to an instruction which was added to the corresponding valid program to invalidate it.

The term "systematically" is used herein in one of its common acceptations to mean "marked by or manifesting system or orderly procedure", or "following or observing a plan, scheme, or design".

Thus, the term "systematically invalidated program" as used herein denotes an invalidated computer program which has been derived from a corresponding valid computer program in a systematic way, i.e., in accordance with a predetermined orderly method or procedure, or by following or observing a predetermined plan, which may be called an "invalidating plan" or "invalidating procedure".

The term "valid" is used herein in one of its common acceptations to denote something which is capable of accomplishing what it is intended to accomplish.

Thus, for example, the expression "valid program" as used herein denotes a computer program which when run on a suitable digital computer is capable of accomplishing the function intended for it by its designer. Accordingly, the term "invalid" can be seen to be used herein to denote something which is *not* capable of accomplishing what it is intended to accomplish. It follows, then, that the expression "invalid program" as used herein denotes a computer program which when run on a computer for which it is intended will not produce the result intended by the designer of the corresponding valid program.

The term "withheld element" as used herein with respect to an invalidated program denotes an element of the corresponding valid program which is not included in the invalidated program.

In accordance with a principal feature of my invention a valid computer program which is to be run on a particular computer embodying my invention is first systematically invalidated in accordance with a particular, unique invalidation program or procedure, and the corresponding restoration program or procedure for restoring the systematically invalidated program to its original, valid form is furnished to that computer. A different invalidation program or procedure is adopted for each computer of my invention which is to be furnished with said valid computer program, so that the particular invalidated version of the valid program which is furnished to any one computer of my invention is different from the particular invalidated version of the valid program which is furnished to any other computer of my invention.

In accordance with another principal feature of my invention each computer embodying my invention comprises a restoration unit containing at least part of at least one restoration program or procedure for restoring a systematically invalidated program to its valid form.

In accordance with yet another principal feature of my invention at least some of the computers embodying my invention comprise confirmation units which serve to confirm that certain prescribed preconditions, e.g., the existence of a certain code or password at a certain memory location, exist before their associated restoration units can be used to restore a furnished, systematically invalidated program to its original, valid form.

In accordance with a further principal feature of my invention the busses of at least some of the computers embodying my invention are subdivided into an external bus, to which are connected the input devices, the output devices, and additional peripheral device connection receptacles, and an internal bus, which is not accessible directly or indirectly without invading the computer housing.

In accordance with a yet further principal feature of my invention each of such external busses is interconnected with its associated internal bus by means of a program-controllable switching unit, called an "external bus access control unit", which responds to each restore instruction in each furnished program by disconnecting the external bus from the internal bus, so that no instruction or data word contained in the restoration unit can be read out by any device attached to the external bus.

In accordance with another principal feature of my invention a confirmation unit in a computer embodying my invention is capable of incapacitating or destroying the restoration unit of that computer, or causing the production of false computational results, when it is not provided with signals indicating the existence of certain prescribed preconditions and an attempt is made to run a furnished program on that computer.

In accordance with yet another principal feature of my invention one of the prescribed precondition signals for use by the confirmation unit of a computer embodying my invention may be supplied by a precondition signal generating unit which is structurally incorporated into the computer, inaccessible from outside the computer, and arranged to destroy itself if an attempt is made to remove it from the computer.

In accordance with still another principal feature of my invention one of the prescribed precondition signals for use by the confirmation unit of a computer embodying my invention may be supplied by a precondition signal generating module which is capable of being carried by a particular person concerned with the operation of that computer, and of being inserted into a receptacle which is, e.g., part of the confirmation unit when made available by said particular person.

In accordance with another principal feature of my invention a prescribed precondition signal for use by the confirmation unit of a computer embodying my invention may be a code or password which is manually entered into a keyboard of the computer, or a keyboard of its restoration unit or confirmation unit, or combined restoration/confirmation unit.

In accordance with another principal feature of my invention one of the prescribed precondition signals for use by the confirmation unit of a computer embodying my invention may be supplied by a calendar-clock circuit contained within the confirmation unit and powered by a battery contained within the confirmation unit, whereby the confirmation unit may be made to permit the running of furnished, systematically invalidated programs only at predetermined times, and/or on predetermined dates.

In accordance with another principal feature of my invention certain ones of said precondition signal generating modules may be provided with self-destruction interlocks, whereby they are destroyed when removed from their receptacles unless removed by authorized service persons with access to the interior of the computer.

In accordance with another principal feature of my invention the restoration unit of a computer embodying my invention may be completely separable from its associated computer, and thus may be separated from its associated computer and transported to a bank vault or the like when not in use.

In accordance with another principal feature of my invention such a separable restoration unit may be completely physically separate from its associated computer when in use, and connected thereto only by a cable or the like, or may take the form of a module which can be inserted into a suitable receptacle or cavity in a face of the computer.

In accordance with yet another principal feature of my invention the restoration units of certain computers embodying my invention may themselves comprise one or more microcomputers programmed to execute certain instructions or routines of the valid programs corresponding to the invalidated programs with which those computers are furnished. A restoration unit of my invention which comprises a microcomputer or the like thus programmed will sometimes be called an "active restoration unit" herein, to distinguish it from the "passive restoration units" described hereinabove.

In accordance with another principal feature of my invention such an active restoration unit may be adapted to derive data from the main memory or memories or accumulator or accumulators of the computer and programmed to carry on certain program operations simultaneously with the carrying out of certain other program operations by the computer itself, whereby the computing speed of the computer can actually be increased over the computer speed of the computer alone by the aid of an active restoration unit.

In accordance with another principal feature of my invention any furnished, systematically invalidated program embodying my invention may be provided with one or more self-cancelling invalidator-revalidator instruction pairs, by means of which it may be possible to prove copying if a copyrighted program embodying my invention is misappropriated and publicly sold.

In accordance with another principal feature of my invention a restoration module embodying my invention may be provided with an externally accessible key pad or like data entry means, and access to certain data storage areas thereof blocked until a particular code is manually entered into the restoration module via the key pad or the like, whereby access to program enhancements built into the restoration module may be denied until the corresponding code to be entered into the key pad or the like is determined from the program furnisher, e.g., for a stated fee.

In accordance with yet another principal feature of my invention, a restoration program may be written to withdraw data used in the restoration process (1) from the same memory unit which contains that restoration program, (2) from a different memory unit contained in the same restoration unit, (3) from a separate memory module connected to the bus of the computer supplied with the restoration unit containing that restoration program, or (4) from a memory unit which is part of the computer supplied with the restoration unit containing that restoration program, or from a combination of selected ones of these sources.

For a fuller understanding of the nature and objects of my invention, reference should be had to the following detailed description, taken in connection with the accompanying drawings.

BRIEF DESCRIPTION OF THE DRAWINGS

FIG. 4 is a schematic diagram of a computer program protection and control system of my invention.

DESCRIPTION OF THE PREFERRED EMBODIMENTS

Figure 1:
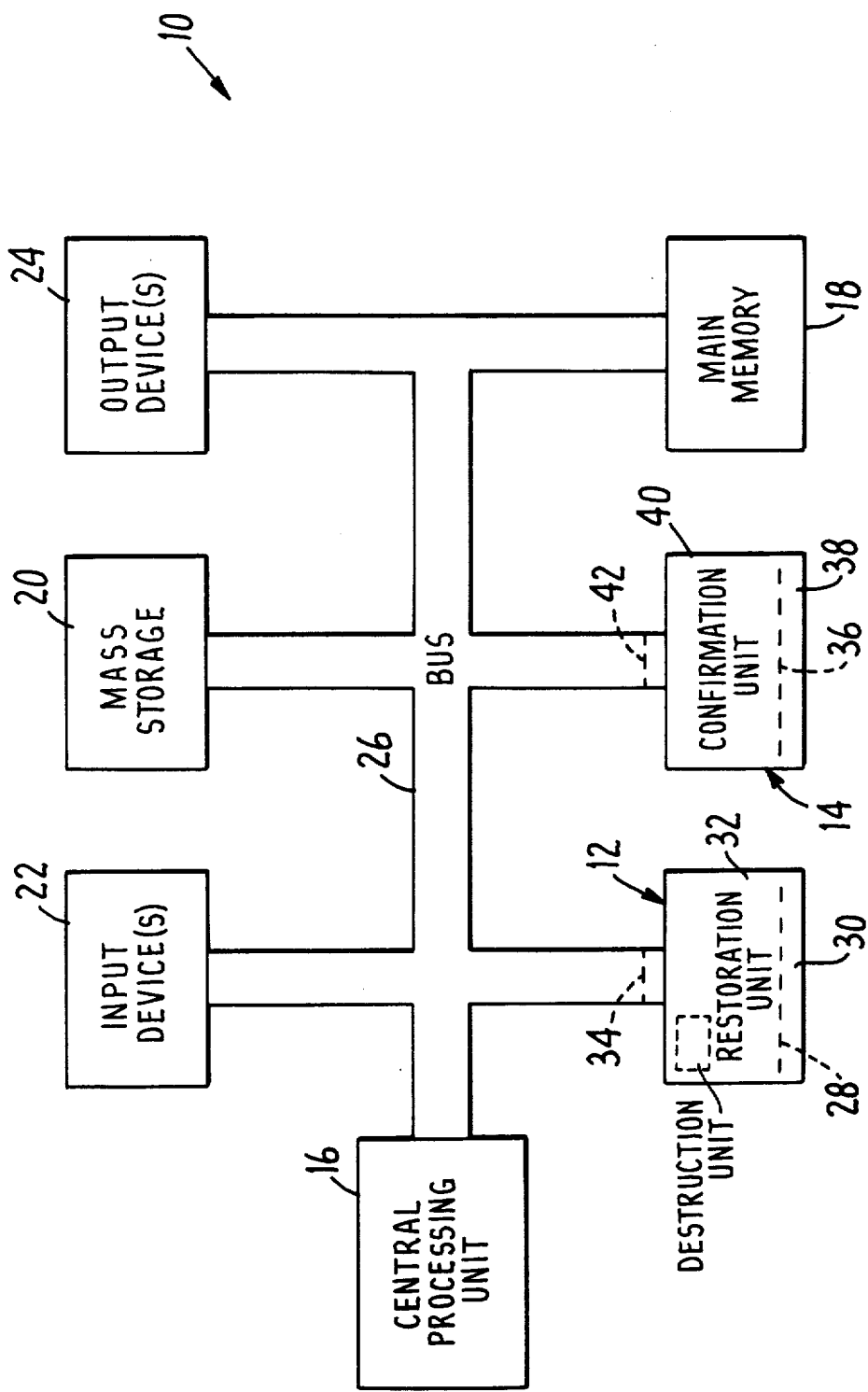
FIG. 1 is a schematic block diagram of a first type of computer embodying my invention.

Referring now to FIG. 1, there is shown a schematic block diagram of a first type of digital computer 10 of my invention, which is equipped with a restoration unit 12 of my invention and a confirmation unit 14 of my invention, whereby computer 10 is enabled to run a systematically invalidated program of my invention, and thereby to produce the same results as would be produced if the corresponding valid program were run on the same digital computer unequipped with restoration unit 12 and confirmation unit 14 but provided with the same input data.

As seen in FIG. 1, digital computer 10 comprises a central processing unit 16, a main memory 18, a mass storage unit 20, one or more input devices 22, one or more output devices 24, and a bus 26 interconnecting all of these units. As is well known to those having ordinary skill in the art, such units, and a bus interconnecting them, are generally found in all modern digital computers.

As further seen in FIG. 1, restoration unit 12 and confirmation unit 14, which are characteristic features of many embodiments of my invention, are both connected to bus 26. Restoration unit 12 and confirmation unit 14 are connected to bus 26 in substantially the same manner in which the several conventional units, 16, 18, 20, 22, 24, of computer 10 are connected to bus 26, and thus restoration unit 12 and confirmation unit 14 can communicate with each other, and with the several conventional units of computer 10, via bus 26.

As indicated by dashed line 28, the restoration units of certain embodiments of my invention comprise a restoration module 30 and a restoration module receiver 32, which itself comprises a receptacle of well-known type for receiving the restoration module.

In accordance with the teachings of my invention, it may be preferable for reasons of program protection to physically incorporate restoration module receiver 32 into the physical structure of computer 10 so that only the receptacle for receiving restoration module 30 is accessible from outside the housing of computer 10.

As indicated by dashed line 34, it will be found desirable in certain embodiments of my invention to employ a restoration unit which is structurally completely separate from computer 10 and is connected to bus 26 thereof by means of a suitable cable terminating in a suitable plug and jack arrangement, which plug and jack arrangement may be understood to be represented by dashed line 34.

Similarly, as indicated by dashed line 36, in certain embodiments of my invention confirmation unit 14 comprises one or more confirmation modules 38, and a confirmation module receiver 40. In some of these embodiments of my invention it may be preferred to physically incorporate confirmation module receiver 40 into the housing of computer 10 such that only the receptacle for receiving confirmation module 38 is accessible from outside the housing of computer 10.

Referring again to FIG. 1, and comparing the showing of restoration unit 12 with the showing of confirmation unit 14, it will be seen that dashed line 42 indicates that in certain embodiments of my invention the confirmation unit may be physically separate from the associated computer, and be interconnected therewith by means of a suitable cable comprising a suitable plug and jack arrangement, represented by dashed line 42.

In certain other embodiments of my invention the confirmation unit may be dispensed with in favor of a "password", entered via one of the input devices 22 or a keyboard which is a part of the restoration unit or the confirmation unit, or a combined restoration/confirmation unit.

Also, in certain preferred embodiments of my invention, the restoration unit may be physically combined with the confirmation unit to constitute a unitary device called the "restoration/confirmation unit" or "RES-CON Unit". Such restoration/confirmation units will in general be physically separate from the associated computer, and interconnected therewith only by a suitable cable comprising a suitable plug and jack arrangement.

In certain embodiments of my invention the restoration/confirmation unit may comprise receptacles for receiving one or more restoration modules and one or more confirmation modules, while in other embodiments the restoration program and the confirmation data may be contained in devices integral with the restoration/confirmation unit. In other embodiments, the confirmation data may be manually entered via a keyboard.

Figure 2:
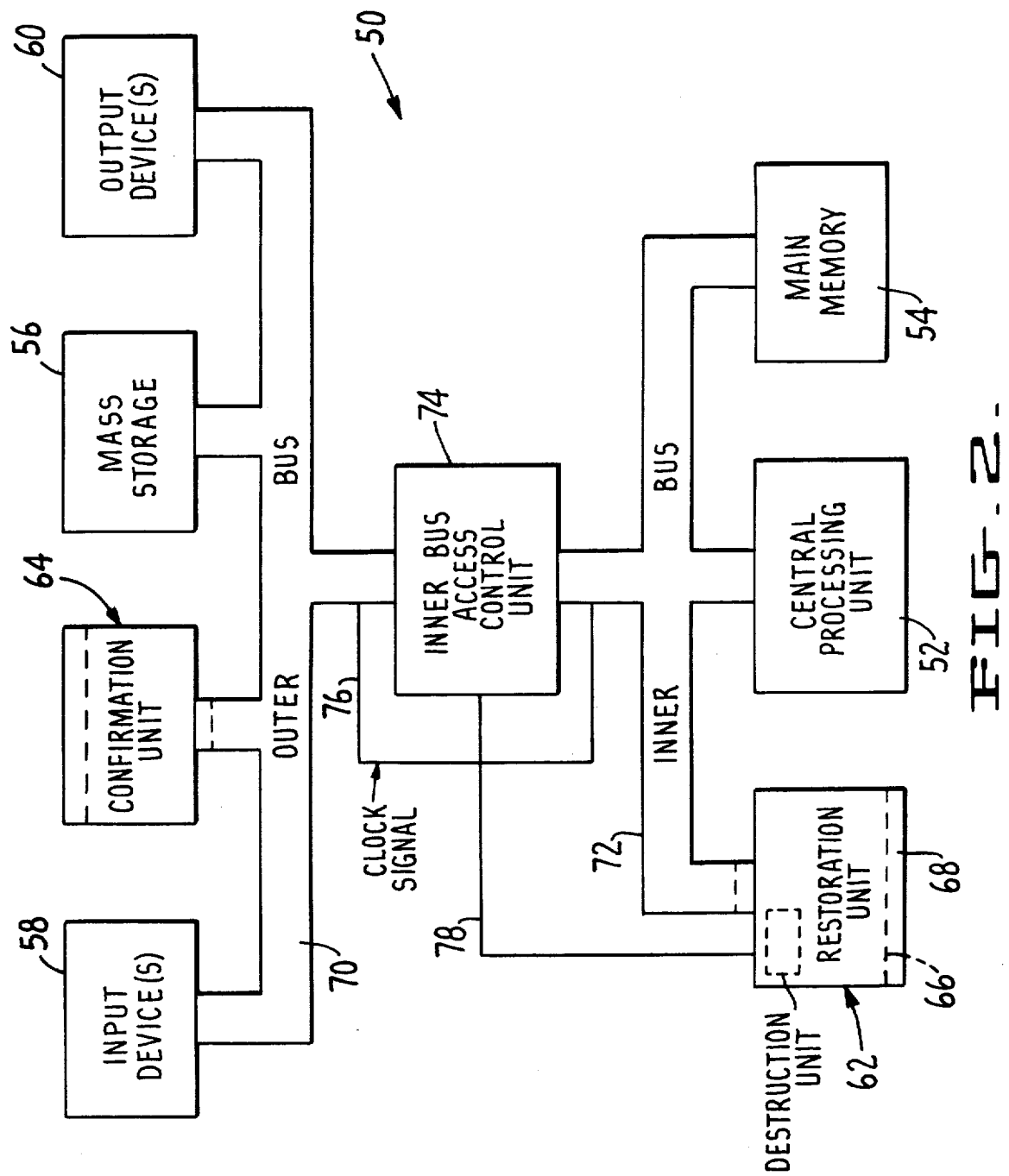
FIG. 2 is a schematic block diagram of a second type of computer embodying my invention.

Referring now to FIG. 2, there is shown a schematic block diagram of a second type of digital computer 50 embodying my invention.

Many elements of the computer 50 of FIG. 2 are similar or substantially identical to corresponding elements of the computer 10 of FIG. 1, and thus reference should be had to the description of FIG. 1 for an understanding of the parts of FIG. 2 which have corresponding legends.

Comparing FIGS. 1 and 2, then, it will be seen that computer 50 of FIG. 2 comprises a central processing unit 52, a main memory unit 54, a mass storage unit or units 56, an input device or devices 58, and an output device or devices 60, which are similar or substantially identical, respectively, to the elements of FIG. 1 identified by the reference numerals 16, 18, 20, 22, and 24.

Similarly, the restoration unit 62 and the confirmation unit 64 of FIG. 2, and the various embodiments thereof which fall within the scope of my invention, and the several parts of each of them, will best be understood by reference to the parts of the description of FIG. 1 relating to the corresponding parts of FIG. 1. Thus, for example, the dashed line 66 of FIG. 2 has the same significance as the dashed line 28 of FIG. 1; the portion 68 of the representation of restoration unit 62 in FIG. 2 has the same significance as the portion 30 of the representation of restoration unit 12 in FIG. 1; etc.

Further, the elements or units 52, 54, 56, 58, 60 of computer 50 of FIG. 2 are interconnected by means of a bus in the same manner in which the corresponding elements or units of FIG. 1 are interconnected by means of bus 26.

As may be seen from FIG. 2, however, the bus of computer 50 is subdivided into two parts, called respectively the "outer bus" 70 and the "inner bus" 72.

Outer bus 70 and inner bus 72 are both connected to an electrical circuit device 74 which is called the "inner bus access control unit" herein.

Inner bus access control unit 74 is operated under the control of restoration unit 62 to isolate outer bus 70 from inner bus 72, and prevent the transmission of signals therebetween, whenever restoration unit 62 is supplying information signals to inner bus 72.

As also seen in FIG. 2, a suitable conductor or conductor set 76 is provided to transmit the clock signal or signals of computer 50 between the clock signal line or lines of inner bus 72 and the corresponding clock signal line or lines of outer bus 70 at all times, i.e., even when the inner bus access control unit 74 is isolating the other conductors or lines of inner bus 72 from the corresponding conductors or lines of outer bus 70. Further, a conductor or conductor set 78 is provided for the purpose of transssmitting control signals from restoration unit 62 to inner bus access control unit 74, although in some embodiments of my invention these control signals may be transmitted via inner bus 72.

Figure 3:
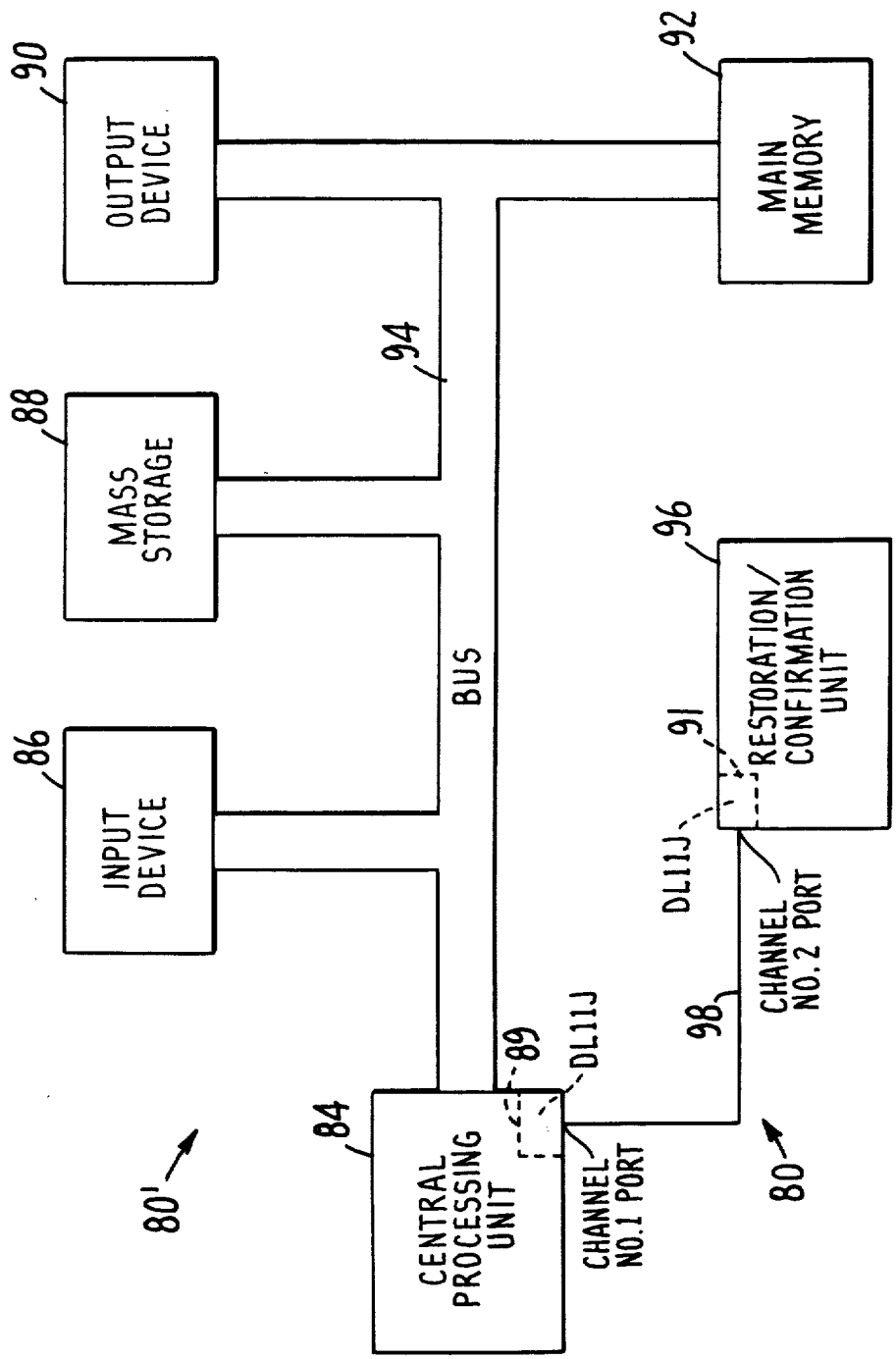
FIG. 3 is a schematic block diagram of a third type of computer embodying my invention.

Referring now to FIG. 3, there is shown a schematic block diagram of an equipped computer 80 which is a particular embodiment of a third type of computer embodying my invention.

As seen in FIG. 3, equipped computer 80 generally comprises a central processing unit 84, an input device or devices 86, a mass storage unit 88, an output device or devices 90, a main memory unit 92, a bus 94, and a restoration/confirmation unit 96. Block 96 also represents a DL11J quad asynchronous serial interface 91.

In computer 80, central processing unit 84 is a central processing unit of the type made and sold by the Digital Equipment Corporation under the commercial designation LSI11. Block 84 also represents a DL11J quad asynchronous serial interface 89.

A Digital Equipment Corporation RXV21 double density floppy disk controller, having two disk drives, serves as one of the input devices 86 of FIG. 3, and also serves as one of the output devices 90 of FIG. 3.

A VT-100 video terminal serves as one of the input devices 86 of FIG. 3, and also serves as one of the output devices 90 of FIG. 3.

Said RXV21 double density floppy disk controller also serves as the mass storage unit 88 of FIG. 3.

A Digital Equipment Corporation 11/03 main frame provides the bus 94 of FIG. 3, which is a Digital Equipment Corporation Q-bus, and further provides the power supply and power connections of equipped computer 80, and the logic and control connections thereof which are not part of Q-bus 94. This Digital Equipment Corporation 11/03 main frame also includes a card cage adapted to receive, support, and provide the electrical connections for other units of computer 80, in the well-known manner.

A Digital Equipment Corporation MSV11D 64 kilobyte memory unit serves as the main memory 92 of computer 80 of FIG. 3.

Equipped computer 80 (FIG. 3) further comprises a Digital Equipment Corporation DL11J quad asynchronous serial interface 89 which is of factory standard configuration, with channels 1 and 2 set to 300 Baud and channel 3 configured for the system console.

The above-described 11/03 main frame, LSI11 central processing unit, MSV11D memory unit, RXV21 double density floppy disk controller, DL11J quad asynchronous serial interface, and VT-100 video terminal are assembled and interconnected in the manner well known to those having ordinary skill in the art, and taught in the instructional materials, provided by the Digital Equipment Corporation, in order to provide a working embodiment of computer 80.

The restoration/confirmation unit 96 of the computer 80 of FIG. 3 is substantially identical to the unequipped computer 80' described immediately hereinabove.

That is to say, restoration/confirmation unit 96 comprises a Digital Equipment Corporation 11/03 main frame, including card cage, Q-bus, back plane, and power supply; a Digital Equipment Corporation LSI11 central processing unit; a Digital Equipment Corporation MSV11D memory unit; a Digital Equipment Corporation RXV21 double density floppy disk controller, including two disk drives; a Digital Equipment Corporation DL11J quad asynchronous serial interface 91, which is of factory standard configuration, with channels 1 and 2 set to 300 Baud, and channel 3 configured for the system console; and a VT-100 video terminal, all assembled and interconnected in the manner well known to those having ordinary skill in the art, and taught in the instructional materials, etc., provided by the Digital Equipment Corporation.

Thus, as will now be seen by those having ordinary skill in the computer and computer programming arts, informed by the present disclosure, the equipment which makes up the restoration/confirmation unit 96 of the embodiment 80 of my invention shown in FIG. 3 is the same equipment, interconnected in the same way, as the equipment which makes up the unequipped computer 80' of FIG. 3, i.e., everything shown in FIG. 3 but restoration/confirmation unit 96 and the interconnection cable 98, which interconnects restoration/confirmation unit 96 and the unequipped computer 80', which unequipped computer 80' comprises central processing unit 84, input device or devices 86, mass storage unit 88, output device or devices 90, main memory unit 92, and bus 94.

As will also be evident to those having ordinary skill in the art, informed by the present disclosure, the difference between restoration/confirmation unit 96 and unequipped computer 80' lies not in their respective physical structures, but rather in their respective programming and memory contents, as described hereinbelow.

As also seen in FIG. 3, restoration/confirmation unit 96 is interconnected with unequipped computer 80' by means of a cable 98. Cable 98 is a serial information transfer cable of the kind sold by the Digital Equipment Corporation under the commercial designation RS232.

As also shown in FIG. 3, cable 98 is connected between the channel 1 port of unequipped computer 80' and the channel 2 port of restoration/confirmation unit 96.

The operating system of the unequipped computer 80' is substantially identical to the operating system of the restoration/confirmation unit 96. Each of these operating systems is a Digital Equipment Corporation RT11, version 3B, operating system, custom-generated to include multi-support for four DL11 asynchronous serial interfaces and Digital Equipment Corporation standard vectors and registers.

The program contained in restoration/confirmation unit 96 is the restoration program listed in detail in the Computer Program Listing which was filed with and constitutes a part of this specification. This restoration program was derived from a valid computer program, listed in detail in said Computer Program Listing, which is entitled "Exposure Calculation Program for Color Photo Enlarging". Thus, said valid program will sometimes be called the "Valid Exposure Program" herein, and said restoration will sometimes be called the "Exposure Program Restoration Program" herein.

The program furnished to equipped computer 80 and contained in mass storage unit 88, is the furnished program listed in detail in the Computer Program Listing which was filed with and constitutes a part of the present specification. Thus, the program contained in mass storage unit 88 when utilizing this embodiment of my invention will sometimes be called the "Furnished Exposure Program" herein.

It is to be particularly noted that the confirmation that certain prescribed preconditions for the running of the furnished program exist is achieved herein by the inclusion of two singularities in the programs generated from the Valid Exposure Program, viz., a password, "SHAZZAAM", and a spurious constant, viz., "82.5". In order to run the equipped computer 80 to provide valid results for any set of valid input data, the password "SHAZZAAM" must be manually entered into the keyboard of one of the VT-100 video terminals when "called for" on the screen thereof, and the spurious constant "82.5" must be properly entered as part of the input data in connection with the furnished program. It is to be particularly noted, however, that in accordance with a feature of my invention, the entry of an incorrect password does not cause equipped computer 80 to "crash", but rather permits computer 80 to continue running, to an incorrect tabulated result.

The Computer Program Listing

By way of example only, and in no sense limiting the scope of my invention, a Computer Program Listing was filed with and constitutes a part of this specification. This Computer Program Listing includes a valid program sometimes called the "Exposure Calculation Program for Color Photo Enlarging" or "Valid Exposure Program" herein; a corresponding furnished program, sometimes called the "Furnished Exposure Program" herein; and a corresponding restoration program, sometimes called the "Exposure Program Restoration Program" herein.

This Computer Program Listing comprises twenty-two (22) computer printout sheets, each of which pages bears the heading "FORTRAN IV V02.04", since the three programs contained in this Computer Program Listing are expressed in the high-level programming language promulgated by the Digital Equipment Corporation, and known as Fortran IV, Digital Equipment Corporation, or "DEC", version 02.04.

The Furnished Exposure Program and the Exposure Program Restoration Program were derived from the Valid Exposure Program by eliminating from the Valid Exposure Program the exposure calculating algorithm thereof, i.e., the part of the Valid Exposure Program which is to be protected from misappropriation by my invention; and placing that exposure calculating algorithm in the Exposure Program Restoration Program, all of which is within the scope of one having ordinary skill in the computer programming art, informed by the present disclosure.

Further as seen in the Computer Program Listing, line 0006, the Exposure Program Restoration Program is adapted to check for a password, viz., SHAZZAAM, and to permit equipped computer 80 to run to a correct result only if that password has been correctly keyed into the keyboard of input device 86, and otherwise to run to an incorrect result (line 0006, restoration program), but not to a "crash".

Yet further, as seen in the Computer Program Listing, line 0008, the Exposure Program Restoration Program is adapted to check for a spurious embedded constant, not actually a part of the data necessary to the algorithm. As there seen, equipped computer 80 is permitted to run to a correct result only if the embedded spurious constant is correct, i.e., 82.5, and otherwise is constrained to run to an incorrect result, but not to a "crash".

As will now be evident to those having ordinary skill in the art, informed by the present disclosure, the Valid Exposure Program is itself kept only by the program supplier, the Furnished Exposure Program is furnished to the equipped computer installation via ordinary commercial program supply channels, and the Exposure Program Restoration Program is supplied to the equipped computer installation either as part of the restoration/confirmation unit or by a highly secure supply channel, e.g., program supply company courier. Further, the equipped computer cannot be successfully run to a valid result unless a custodian of the equipped computer installation knows and properly enters the password SHAZZAAM.

As an example only of the operation of equipped computer 80, constructed and programmed as described hereinabove, let it be considered that it is desired to produce an enlarged color photo by the use of a Besseler 23C enlarger, using Ciba-chrome paper, making an 8×10 enlargement from 35 millimeter film, and that the values entered into the keyboard of input device 86 are as follows: Enlarger Offset, 10.0; Brightness Constant, 100; Focal Length, 50; ANSI Paper Speed, 85; Zero Pack, 60, 70, 0; Paper Pack (arbitrary), 0, 10, 5; Filter Changes to correct for minor color change due to particular film, xxx; Exposure Factor, changed to compensate for a thin or a dense negative, 1.00; Lens f-stop, 5.6; and Enlarger Scale Setting, 11.5. Typical corresponding results outputted by way of an output device 90, Yellow, 55; Magenta, 75; Cyan, 0; f-stop, 5.6; Time, 8.8 seconds.

Additional Embodiments

An additional embodiment of my invention attaches directly to the input/output or I/O channel of a digital computer. This channel may either be multiplexed or may be a dedicated "selector channel" and may be a high speed channel or a low speed channel.

A valid program to be employed in connection with this embodiment is modified to remove one or more selected subroutines which are considered by the program supplier, or the supplier's customer, to be critical, and which thus must be protected from unauthorized use. The thus selected subroutine or subroutines may perform any valid function of the program, e.g., may be the entire algorithm of the program, as in the embodiment of my invention described in connection with FIG. 3. The removed subroutine or subroutines may be referred to as "privileged". The remainder of this valid program may correspondingly be called "clear".

The privileged subroutine or subroutines may be activated or employed in one of at least two modes, provided that the corresponding confirmation unit requirements are satisfied, designated below as A and B.

A. Data Mode. When the clear portion of the valid program has proceeded in processing to the point where a privileged subroutine must be called or activated, the clear portion is arranged in such a manner than an I/O requirement is generated. An output is first generated which contains the data required by the privileged subroutine in order to function. Also generated for output is an access code or set of codes used by the confirmation module to verify that access is allowed. Such codes may be automatically generated or may be entered as a part of initiating program processing. Various transformations of access codes may take place in either the clear or the privileged portion of the program as processing progresses.

When access is allowed, the restoration unit accepts and processes the data generated as output by the clear portion of the program. When the privileged processing is complete, the data generated is returned to the clear portion of the program, and host processing continues. This case requires that a privileged processor be used to process the privileged routines. No access to the privileged processor is available without the appropriate confirmation codes.

B. Instruction Mode. When the clear portion of the program has proceeded in processing to the point where a privileged subroutine may be activated, the clear portion is arranged in such a manner that a subroutine call is issued to the confirmation unit. The call contains the access code or set of codes required for access to the privileged subroutine. Alternatively, the confirmation unit may be completely or partially conditioned when processing is initiated to respond to subroutine calls. When access is allowed, the restoration unit supplies the subroutine, in normal form, to the host processor.

Variations of instruction mode may apply any combination of substitution, replacement, deletion or alteration techniques. Such combination may be varied by application of predetermined codes or computed factors, and may vary from one processing run to another. The restoration unit may be set up to apply one or many combinations of instruction mode or data mode techniques to the same program in the same processing run.

Computations in the clear portion of the program may condition the confirmation unit or effect the procedural operation of the restoration unit.

Both the confirmation unit and the restoration unit may be physically protected from access by various means already taught and practiced in the art.

A further and different embodiment of my invention may be retrofitted to existing digital computer designs or be included in the original design of a digital computer. In accordance with this embodiment of my invention, the valid program is modified to remove selected subroutines as in the embodiment of my invention described immediately hereinabove.

The confirmation unit and the restoration unit may be interconnected to the various buses internal to the host computer. Separate processors may or may not be required. Both the confirmation unit and the restoration unit may be physically protected by various means already taught and practiced in the art.

The standard operating system of the host computer may be modified in this embodiment, either permanently or dynamically, by the restoration unit. Such modification may render inoperative (or provide) functions, included but not limited to, analytic and/or diagnostic functions while the protected program is being processed.

The Computer Protection and Control System of the Invention

Referring now to FIG. 4, there is shown a schematic diagram of a computer program protection and control system embodying my invention.

As there seen, the complete area of FIG. 4 is divided into three subareas 100, 102, 104 by vertical lines 106 and 108.

Area 100 represents a facility of a computer program supplier wherein a particular valid program, originating there or elsewhere, is processed for protection and control thereof in accordance with the teachings of my invention.

In accordance with the teachings of my invention, valid program 110 remains within facility 100, and is not at any time sold to any program purchaser, or leased to any program lessee. Rather, valid program 110 is maintained in facility 100 under strict security conditions.

In facility 100, valid program 110 is, e.g., stripped of its most commercially valuable elements, i.e., is made into a diminished program, or has invalidators added to it, i.e., is made into an augmented program, or both.

These steps can be accomplished by programmers of ordinary skill, without the exercise of invention or more than ordinary programming skill, in view of the teachings of this specification, and may in large part be mechanized on ordinary computers without exceeding the scope of those having ordinary skill in the programming arts. The selection of the elements to be stripped out of valid program 110 is, of course, a matter of human judgment, but does not exceed the level of ordinary programming skill, in view of the teachings of the present specification.

As indicated by line 112 of FIG. 4, valid program 110, after being processed as described immediately above to systematically invalidate it, may also be provided with identifying elements, such as added machine-language code numbers or the like, or may be provided with singularizing elements, i.e., added elements which are unique to only one of the furnished programs corresponding to particular valid program 110, whereafter it is a corresponding furnished program 114.

Furnished program 114 is then loaded onto a furnished medium 116, such as a floppy disk, in the well-known manner. By the term "furnished" is meant that the medium 116 will ultimately be furnished to a purchaser or lessee, and is not meant that the customer of the computer program supplier furnishes the medium.

It is to be particularly noted that the term "XYZ" represents the unique identifying number which may be added to furnished program 114, either explicitly or implicitly. Identifying number XYZ may, in accordance with the teachings of my invention, be permanently marked on the furnished medium, in machine-language, or on the shipping carton of the furnished medium, in human language.

Referring again to FIG. 4, line 118 thereof will be seen to designate the process of generating the corresponding restoration program 120 from the elements stripped from valid program 110. At the same time, restoration program 120 is provided with restoration codes and the like, whereby the equipped computer will be instructed to correctly reassemble the data found on furnished medium 116 and in the corresponding restoration unit 122 into a valid program, during the running of the valid program thereon, by means of furnished medium 116 and corresponding restoration unit 122.

As further seen in FIG. 4, the confirmation data 124 corresponding to a valid program XYZ is loaded into a corresponding confirmation unit XYZ, which is also identified by the reference numeral 126.

The word "loaded" is used in a very broad sense herein, to denote that the XYZ confirmation data may not only be stored in a magnetic storage medium, such as a floppy disk, but may even be printed or typewritten on a sheet of paper which is to be communicated to a custodian who is regularly employed at the XYZ equipped computer installation and can there enter the confirmation data on a keyboard of the equipped computer.

Going to the central area 102 of FIG. 4, it will now be understood by those having ordinary skill in the art, informed by the present disclosure, that channels A, B and C are ordinary channels of commerce, such as freight, express, air cargo, parcel post, and the like.

It is to be particularly understood, then, that the showing of the area 102 of FIG. 4 is to indicate that the restoration unit 122 of the equipped computer XYZ, the confirmation unit 126 of the equipped computer, and the furnished medium 116 whereby the furnished program 114 corresponding to valid program 110 is furnished to the equipped computer XYZ are all supplied to the equipped computer installation XYZ by separate channels of commerce in accordance with the principles of my invention.

It is further to be particularly noted that channel A, channel B, or channel C may, in some instances, be a courier route, or a telephone line, or a microwave transmission link.

Reference is now had to area 104 of FIG. 4, which represents the equipped computer installation XYZ which is supplied with restoration unit 122, confirmation unit 126, and furnished medium 116 by the program supplier which is the proprietor of facility 100.

As seen in FIG. 104, furnished program No. XYZ is supplied to the input device of equipped computer 130, wherein it is stored in mass storage unit 132.

As also there seen, the confirmation data corresponding to furnished program No. XYZ is furnished, by way of a separate commercial channel, to a custodian of equipped computer 130, and *not* to the input device or devices 134 of equipped computer 130.

The said custodian might, in some instances, key the confirmation data into equipped computer 130; while, in accordance with other embodiments of my invention, the XYZ confirmation data may be contained in a physical device, such as a PROM or a tape cassette, which device is inserted into a confirmation unit receptacle 136 by the custodian, who normally has sole custody of that device and leaves that device in confirmation unit receptacle 136 only long enough to permit the running of furnished program XYZ.

As further seen in FIG. 4, it is contemplated as part of my invention that restoration program XYZ will be loaded into a restoration unit designated and marked as restoration unit No. XYZ, and that restoration unit No. XYZ will, after being carried to equipped computer installation 104 over a separate commercial channel, and remaining in the hands of the computer program supplier or its appointees or personnel, be installed in an internal restoration unit receptacle 138 in equipped computer 130, which receptacle is only accessible to equipped computer installation personnel, as distinct from the computer program supplier's personnel, by forceful methods or means which leave a clear indication of this intrusion into equipped computer 130.

Given that furnished program No. XYZ has been loaded into equipped computer 130, that confirmation data XYZ has been supplied to equipped computer 130, and that restoration program No. XYZ has been installed in equipped computer 130, all as described above, it follows that when input data for a particular run of valid program No. XYZ, designated by reference numeral 140, is supplied to equipped computer 130 for processing, the valid results for that particular run will be outputted by output device 142, the valid results being the results which would have been outputted by an unequipped computer 130' corresponding to equipped computer 130 when executing the corresponding valid program.

It will thus be seen that the objects set forth above, among those made apparent from the preceding description, are efficiently attained, and since certain changes may be made in the above constructions and the methods carried out thereby without departing from the scope of my invention, it is intended that all matter contained in the above description or shown in the accompanying drawings shall be interpreted as illustrative only, and not in a limiting sense.

It is also to be understood that the following claims are intended to cover all of the generic and specific features of my invention herein described, and all statements of the scope of my invention which, as a matter of language, might be said to fall therebetween.

CONTENTS

VALID PROGRAM
FURNISHED PROGRAM
RESTORATION PROGRAM

```
OPTIONS IN EFFECT:                                              621.1
                    SOURCE
                    NOMAP
                    NOCODE
                    NOLEAPYEAR
                    NOREADONLY
                       LRECL=0136
                    NOSTAT
                       ISNS
                    NOCOLS0
                    NOUSRSWAP
                    NODIAGNOSE
                    NOINTEGER*4
                       NLCHN=04
                    NODEBUG
                       VECTOR
                    NOWARN
                       CODE:EIS
                       OPTIM:SIZ:CSE:STR:BND:PEP
                       LOG

01

0001          PROGRAM    EXPOSE                                 621.1
       C
       C      THIS PROGRAM COMPUTES THE PRINT EXPOSURE TIME, FOR AN ENLARGER
       C      BASED ON HEIGHT, FOCAL LENGTH, F STOP, COLOR FILTRATION, AND
       C      PAPER CHARACHTERISTICS.
       C
       C
       C      DATA DECLARATIONS
       C
0002          INTEGER YES, ITEMP
0003          REAL CONVAR(13), DATOUT(5)
0004          DATA YES/'Y'/
0005          COMMON CONVAR, DATOUT
       C
       C
       C      MAIN PROGRAM BODY
       C
0006   100    FORMAT (/' FORTRAN EXPOSURE CALCULATION PROGRAM V 1.0'//
              #' NOTE: A CARRIAGE RETURN ONLY, IS EQUAL TO 0.0'//)
0007          WRITE (7,100)
0008   110    CALL DATCON
0009   120    CALL DATVAR
0010          CALL ALGRTM
       C
       C
       C      OUTPUT OF DATA
       C
0011   130    FORMAT (' YELLOW  = ',F4.0/' MAGENTA = ',F4.0/' CYAN    = ',
              #F4.0/' F STOP  = 'F4.1/' TIME    = ',F4.1//)
0012          WRITE (7,130) (DATOUT(J),J=1,5)
       C
       C
```

```
C        BRANCH TO DATA ENTRY OF VARIABLES OR CONSTANTS FOR ANOTHER
C        RUN, OR END PROGRAM.
C
0013  140    FORMAT ('$DO YOU WISH TO CHANGE VARIABLES? (Y/N) > ')
0014         WRITE (7,140)
0015  150    FORMAT (A1)
0016         READ (5,150) ITEMP
0017         IF (ITEMP.EQ.YES) GO TO 120
      C
0019  160    FORMAT ('$DO YOU WISH TO CHANGE CONSTANTS? (Y/N) > ')
0020         WRITE (7,160)
0021         READ (5,150) ITEMP
0022         IF (ITEMP.EQ.YES) GO TO 110
      C
0024         STOP
0025         END

C        DATA ENTRY SUBROUTINE FOR CONSTANTS                    621.1
C
C
0001         SUBROUTINE DATCON
      C
      C
      C   DATA DECLARATIONS
      C
0002         REAL CONVAR(13), DATOUT(5)
0003         COMMON CONVAR, DATOUT
      C
0004  900    FORMAT(' *** DATA ENTRY ERROR ***',/)
      C
0005  500    FORMAT ('$ENTER PASSWORD = ? > ')
0006  501    WRITE (7,500)
0007  505    FORMAT (2A4)
0008         READ (5,505,ERR=506) (CONVAR(J),J=1,2)
0009         GO TO 507
0010  506    WRITE (7,900)
0011         GO TO 501
0012  507    CONVAR(3) = 82.5
      C
0013  510    FORMAT ('$ENTER ENLARGER OFFSET (FILM PLANE - SCALE)
             # IN INCHES = (xx.x) = ')
0014  511    WRITE (7,510)
0015  515    FORMAT (F4.1)
0016         READ (5,515,ERR=516) CONVAR(4)
0017         IF (CONVAR(4).LT.(0.0).OR.CONVAR(4).GT.(15.0)) GOTO 516
0019         GO TO 521
0020  516    WRITE (7,900)
0021         GO TO 511
      C
0022  520    FORMAT ('$ENTER ENLARGER BRIGHTNESS CONSTANT = (xxx) = ')
0023  521    WRITE (7,520)
0024  525    FORMAT (F4.0)
0025         READ (5,525,ERR=526) CONVAR(5)
0026         IF (CONVAR(5).LT.(20.0).OR.CONVAR(5).GT.(500.0)) GOTO 526
0028         GO TO 531
0029  526    WRITE (7,900)
0030         GO TO 521
      C
0031  530    FORMAT ('$ENTER LENS FOCAL LENGTH IN MILLIMETERS = (xxx) = ')
0032  531    WRITE (7,530)
0033         READ (5,525,ERR=536) CONVAR(6)
0034         IF (CONVAR(6).LT.(35.0).OR.CONVAR(6).GT.(135.0)) GOTO 536
0036         GO TO 541
0037  536    WRITE (7,900)
0038         GO TO 531
      C
```

```
0039  540    FORMAT ('$ENTER ANSI PAPER SPEED = (xxx) = ')
0040  541    WRITE (7,540)
0041         READ (5,525,ERR=546) CONVAR(7)
0042         IF (CONVAR(7).LT.(10.0)) GOTO 546
0044         GOTO 551
```

621.1

```
0045  546    WRITE (7,900)
0046         GO TO 541
      C
0047  550    FORMAT (' ENTER ZERO PACK.'/
             #'$(YELLOW, MAGENTA, CYAN) = (yyy,mmm,ccc) = ')
0048  551    WRITE (7,550)
0049  555    FORMAT (3F4.0)
0050         READ (5,555,ERR=556) (CONVAR(J),J=8,10)
0051         GO TO 561
0052  556    WRITE (7,900)
0053         GO TO 551
      C
0054  560    FORMAT(' ENTER PAPER PACK.'/
             #'$(YELLOW, MAGENTA, CYAN) = (yyy,mmm,ccc) = ')
0055  561    WRITE (7,560)
0056         READ (5,555,ERR=566) (CONVAR(J),J=11,13)
0057         GO TO 567
0058  566    WRITE (7,900)
0059         GO TO 561
0060  567    CONVAR(8) = CONVAR(8) + CONVAR(11)
0061         CONVAR(9) = CONVAR(9) + CONVAR(12)
0062         CONVAR(10) = CONVAR(10) + CONVAR(13)
      C
0063         RETURN
0064         END
```

621.1

```
      C      THIS ROUTINE ALLOWS VARIABLES TO BE INSERTED IN CONVAR(13)
      C
0001         SUBROUTINE DATVAR
      C
      C
      C      DATA DECLARATIONS
      C
0002         REAL CONVAR(13), DATOUT(5)
0003         COMMON CONVAR, DATOUT
      C
0004  900    FORMAT(' *** DATA ENTRY ERROR ***'/)
      C
0005  600    FORMAT (/,' CURRENT FILTER PACK VALUES'// YELLOW = ',F4.0/
             #' MAGENTA = ',F4.0/' CYAN    = ',F4.0,/)
0006         WRITE (7,600) (CONVAR(J),J=8,10)
      C
0007  610    FORMAT (' ENTER FILTER CHANGES (DEFAULT VALUES ARE ZERO)'/
             #'$(YELLOW, MAGENTA, CYAN) = (yyy,mmm,ccc) = ')
0008  611    WRITE (7,610)
0009  615    FORMAT (3F4.0)
0010         READ (5,615,ERR=616) (CONVAR(J),J=11,13)
0011         GO TO 617
0012  616    WRITE (7,900)
0013         GO TO 611
0014  617    CONVAR(8) = CONVAR(8) + CONVAR(11)
0015         CONVAR(9) = CONVAR(9) + CONVAR(12)
0016         CONVAR(10) = CONVAR(10) + CONVAR(13)
      C
0017  620    FORMAT ('$ENTER EXPOSURE FACTOR (DEFAULT = 1.00) = (x.xx) = ')
0018  621    WRITE (7,620)
0019  625    FORMAT (F4.2)
0020         READ (5,625,ERR=626) CONVAR(11)
0021         IF (CONVAR(11).EQ.0.0)  CONVAR(11) = 1.00
0023         IF (CONVAR(11).LT.(.2).OR.CONVAR(11).GT.(5.0)) GOTO 626
0025         GO TO 631
```

```
0026    626     WRITE (7,900)
0027            GO TO 621
        C
0028    630     FORMAT ('$ENTER ENLARGER LENS SETTING. F STOP = (xx.x) = ')
0029    631     WRITE (7,630)
0030    635     FORMAT (F4.1)
0031            READ (5,635,ERR=636) CONVAR(12)
0032            IF (CONVAR(12).LT.(2.8).OR.CONVAR(12).GT.(22.0)) GOTO 636
0034            GO TO 641
0035    636     WRITE (7,900)
0036            GO TO 631
        C
0037    640     FORMAT ('$ENTER ENLARGER SCALE READING IN INCHES = (xx.x) = ')
0038    641     WRITE (7,640)
0039            READ (5,635,ERR=646) CONVAR(13)
0040            IF (CONVAR(13).LT.(2.0).OR.CONVAR(13).GT.(33.0)) GOTO 646
0042            GO TO 647
0043    646     WRITE (7,900)
0044            GO TO 641

0045    647     CONTINUE                                          621.1
        C
0046            RETURN
0047            END
```

```
FORTRAN IV       V02.04      Sun 11-Apr-82 00:00:00              PAGE 001
                                                                 621.1
        C       THIS ROUTINE COMPUTES THE PRINT EXPOSURE TIME, FOR AN ENLARGER
        C       BASED ON HEIGHT, FOCAL LENGTH, F STOP, COLOR FILTRATION, AND
        C       PAPER CHARACHTERISTICS.
        C
        C
0001            SUBROUTINE ALGRTM
        C
        C
        C       DATA DECLARATIONS
        C
0002            REAL CONVAR(13), DATOUT(5), CF, FS, HT, MR, TIME
0003            COMMON CONVAR, DATOUT
        C
        C
        C       MEANING OF VARIABLES USED IN THE ALGORITHM
        C
        C       CONVAR(4)  = ENLARGER OFFSET IN INCHES
        C       CONVAR(5)  = ENLARGER BRIGHTNESS CONSTANT
        C       CONVAR(6)  = FOCAL LENGTH OF ENLARGER LENS IN MILLIMETERS
        C       CONVAR(7)  = ANSI PAPER SPEED
        C       CONVAR(8)  = TOTAL CC UNITS OF YELLOW FILTRATION
        C       CONVAR(9)  = TOTAL CC UNITS OF MAGENTA FILTRATION
        C       CONVAR(10) = TOTAL CC UNITS OF CYAN FILTRATION
        C       CONVAR(11) = EXPOSURE CONSTANT FOR VARYING THE PRINT DENSITY
        C       CONVAR(12) = F STOP SETTING OF THE ENLARGER LENS
        C       CONVAR(13) = SCALE HEIGHT OF THE ENLARGER IN INCHES
        C       CF         = COMBINED EXPOSURE CORRECTION FOR COLOR FILTRATION
        C       FS         = SQUARE OF THE F STOP
        C       HT         = HEIGHT OF FILM PLANE ABOVE BASEBOARD IN MILLIMETERS
        C       MR         = EXPOSURE CORRECTION FOR MAGNIFICATION RATIO
        C       TIME       = CALCULATED EXPOSURE TIME
        C
        C
        C       REMOVES NUETRAL DENSITY FROM THE FILTER PACK BY SUBTRACTING THE
        C       LOWEST CC UNIT FILTER FROM THE TWO REMAINING FILTERS.
        C
0004            IF(CONVAR(8).LE.CONVAR(9).AND.CONVAR(8).LE.CONVAR(10))GOTO 800
0006            IF(CONVAR(9).LE.CONVAR(8).AND.CONVAR(9).LE.CONVAR(10))GOTO 810
```

```
0008            GOTO 820
0009    800     CONVAR(8) = 0.0
0010            CONVAR(9) = CONVAR(9) - CONVAR(8)
0011            CONVAR(10) = CONVAR(10) - CONVAR(8)
0012            GO TO 830
0013    810     CONVAR(8) = CONVAR(8) - CONVAR(9)
0014            CONVAR(9) = 0.0
0015            CONVAR(10) = CONVAR(10) - CONVAR(9)
0016            GO TO 830
0017    820     CONVAR(8) = CONVAR(8) - CONVAR(10)
0018            CONVAR(9) = CONVAR(9) - CONVAR(10)
0019            CONVAR(10) = 0.0
        C
        C
        C
        C       ALGORITHM FOR COMPUTING EXPOSURE TIME
        C
0020    830     CF = (1.0+.01*CONVAR(8))*(1.0+.2*CONVAR(9))*(1.0+.1*CONVAR(10))
0021            FS = CONVAR(12)*CONVAR(12)
0022            HT = 25.4*(CONVAR(4) + CONVAR(13))
0023            MR = (2*HT/(HT-SQRT(HT*(HT-CONVAR(6)*4.0))))**2.0
        C
0024            TIME = (CONVAR(11)*FS*MR*CF)/(CONVAR(5)*CONVAR(7))
        C
        C
        C       DATA IS STORED FOR TRANSMISSION IN ARRAY(5) DATOUT
        C
0025            DATOUT(1) = CONVAR(8)
0026            DATOUT(2) = CONVAR(9)
0027            DATOUT(3) = CONVAR(10)
0028            DATOUT(4) = CONVAR(12)
0029            DATOUT(5) = TIME
        C
0030            RETURN
0031            END

FORTRAN IV      V02.04

EXPOSE,EXPOSE=EXPOSE/0/U/L:1/N:4

OPTIONS IN EFFECT:

SOURCE
                     NOMAP
                     NOCODE
                     NOLEAPYEAR
                     NOREADONLY
                        LRECL=0136
                     NOSTAT
                        ISNS
                     NOCOL80
                     NOUSRSWAP
                     NODIAGNOSE
                     NOINTEGER*4
                        NLCHN=04
                     NODEBUG
                        VECTOR
                     NOWARN
                        CODE:EIS
                        OPTIM:SIZ:CSE:STR:BND:PEP
                        LOG

0001            PROGRAM         EXPOSE
        C
        C       THIS PROGRAM COMPUTES THE PRINT EXPOSURE TIME, FOR AN ENLARGER
        C       BASED ON HEIGHT, FOCAL LENGTH, F STOP, COLOR FILTRATION, AND
        C       PAPER CHARACHTERISTICS.
```

```
            C
            C
            C       DATA DECLARATIONS
            C
0002                INTEGER YES, ITEMP
0003                REAL CONVAR(13), DATOUT(5)
0004                DATA YES/'Y'/
0005                COMMON CONVAR, DATOUT
            C
            C
            C       MAIN PROGRAM BODY
            C
0006    100         FORMAT (/' FORTRAN EXPOSURE CALCULATION PROGRAM V 1.0'//
                   #' NOTE: A CARRIAGE RETURN ONLY, IS EQUAL TO 0.0'///)
0007                WRITE (7,100)
0008    110         CALL DATCON
0009    120         CALL DATVAR
0010                CALL TRMTCV
0011                CALL RCVRDO
            C
            C
            C       OUTPUT OF DATA
            C
0012    130         FORMAT (' YELLOW  = ',F4.0/' MAGENTA = ',F4.0/' CYAN    = ',
                   #F4.0/' F STOP  = 'F4.1/' TIME    = ',F4.1//)
0013                WRITE (7,130) (DATOUT(J),J=1,5)
            C
            C
            C       BRANCH TO DATA ENTRY OF VARIABLES OR CONSTANTS FOR ANOTHER
            C       RUN, OR END PROGRAM.
            C
0014    140         FORMAT ('$DO YOU WISH TO CHANGE VARIABLES? (Y/N) > ')
0015                WRITE (7,140)
0016    150         FORMAT (A1)
0017                READ (5,150) ITEMP
0018                IF (ITEMP.EQ.YES) GO TO 120
            C
0020    160         FORMAT ('$DO YOU WISH TO CHANGE CONSTANTS? (Y/N) > ')
0021                WRITE (7,160)
0022                READ (5,150) ITEMP
0023                IF (ITEMP.EQ.YES) GO TO 110
            C
0025                STOP
0026                END
```

```
            C       DATA ENTRY SUBROUTINE FOR CONSTANTS
            C
            C
0001                SUBROUTINE DATCON
            C
            C
            C       DATA DECLARATIONS
            C
0002                REAL CONVAR(13), DATOUT(5)
0003                COMMON CONVAR, DATOUT
            C
0004    900         FORMAT(' *** DATA ENTRY ERROR ***',/)
            C
0005    500         FORMAT ('$ENTER PASSWORD = ? > ')
0006    501         WRITE (7,500)
0007    505         FORMAT (2A4)
0008                READ (5,505,ERR=506) (CONVAR(J),J=1,2)
0009                GO TO 507
0010    506         WRITE (7,900)
0011                GO TO 501
0012    507         CONVAR(3) = 82.5
            C
```

```
0013   510    FORMAT ('$ENTER ENLARGER OFFSET (FILM PLANE - SCALE)
              # IN INCHES = (xx.x) = ')
0014   511    WRITE (7,510)
0015   515    FORMAT (F4.1)
0016          READ (5,515,ERR=516) CONVAR(4)
0017          IF (CONVAR(4).LT.(0.0).OR.CONVAR(4).GT.(15.0)) GOTO 516
0019          GO TO 521
0020   516    WRITE (7,900)
0021          GO TO 511
       C
0022   520    FORMAT ('$ENTER ENLARGER BRIGHTNESS CONSTANT = (xxx) = ')
0023   521    WRITE (7,520)
0024   525    FORMAT (F4.0)
0025          READ (5,525,ERR=526) CONVAR(5)
0026          IF (CONVAR(5).LT.(20.0).OR.CONVAR(5).GT.(500.0)) GOTO 526
0028          GO TO 531
0029   526    WRITE (7,900)
0030          GO TO 521
       C
0031   530    FORMAT ('$ENTER LENS FOCAL LENGTH IN MILLIMETERS = (xxx) = ')
0032   531    WRITE (7,530)
0033          READ (5,525,ERR=536) CONVAR(6)
0034          IF (CONVAR(6).LT.(35.0).OR.CONVAR(6).GT.(135.0)) GOTO 536
0036          GO TO 541
0037   536    WRITE (7,900)
0038          GO TO 531
       C
0039   540    FORMAT ('$ENTER ANSI PAPER SPEED = (xxx) = ')
0040   541    WRITE (7,540)
0041          READ (5,525,ERR=546) CONVAR(7)
0042          IF (CONVAR(7).LT.(10.0)) GOTO 546
0044          GOTO 551

0045   546    WRITE (7,900)
0046          GO TO 541
       C
0047   550    FORMAT (' ENTER ZERO PACK.'/
              #'$(YELLOW, MAGENTA, CYAN) = (yyy,mmm,ccc) = ')
0048   551    WRITE (7,550)
0049   555    FORMAT (3F4.0)
0050          READ (5,555,ERR=556) (CONVAR(J),J=8,10)
0051          GO TO 561
0052   556    WRITE (7,900)
0053          GO TO 551
       C
0054   560    FORMAT(' ENTER PAPER PACK.'/
              #'$(YELLOW, MAGENTA, CYAN) = (yyy,mmm,ccc) = ')
0055   561    WRITE (7,560)
0056          READ (5,555,ERR=566) (CONVAR(J),J=11,13)
0057          GO TO 567
0058   566    WRITE (7,900)
0059          GO TO 561
0060   567    CONVAR(8) = CONVAR(8) + CONVAR(11)
              CONVAR(9) = CONVAR(9) + CONVAR(12)
              CONVAR(10) = CONVAR(10) + CONVAR(13)
       C
0063          RETURN
0064          END C      THIS ROUTINE ALLOWS VARIABLES TO BE INSERTED IN CONVAR(13)
       C
0001          SUBROUTINE DATVAR
       C
       C
       C      DATA DECLARATIONS
       C
```

```
0002            REAL CONVAR(13), DATOUT(5)
0003            COMMON CONVAR, DATOUT
                C
0004    900     FORMAT(' *** DATA ENTRY ERROR ***'/)
                C
0005    600     FORMAT (/,' CURRENT FILTER PACK VALUES'// YELLOW   = ',F4.0/
                #' MAGENTA = ',F4.0/' CYAN      = ',F4.0,/)
0006            WRITE (7,600) (CONVAR(J),J=8,10)
                C
0007    610     FORMAT (' ENTER FILTER CHANGES (DEFAULT VALUES ARE ZERO)'/
                #'$(YELLOW, MAGENTA, CYAN) = (yyy,mmm,ccc) = ')
0008    611     WRITE (7,610)
0009    615     FORMAT (3F4.0)
0010            READ (5,615,ERR=616) (CONVAR(J),J=11,13)
0011            GO TO 617
0012    616     WRITE (7,900)
0013            GO TO 611
0014    617     CONVAR(8) = CONVAR(8) + CONVAR(11)
0015            CONVAR(9) = CONVAR(9) + CONVAR(12)
0016            CONVAR(10) = CONVAR(10) + CONVAR(13)
                C
0017    620     FORMAT ('$ENTER EXPOSURE FACTOR (DEFAULT = 1.00) = (x.xx) = ')
0018    621     WRITE (7,620)
0019    625     FORMAT (F4.2)
0020            READ (5,625,ERR=626) CONVAR(11)
0021            IF (CONVAR(11).EQ.0.0)  CONVAR(11) = 1.00
0023            IF (CONVAR(11).LT.(.2).OR.CONVAR(11).GT.(5.0)) GOTO 626
0025            GO TO 631
0026    626     WRITE (7,900)
0027            GO TO 621
                C
0028    630     FORMAT ('$ENTER ENLARGER LENS SETTING. F STOP = (xx.x) = ')
0029    631     WRITE (7,630)
0030    635     FORMAT (F4.1)
0031            READ (5,635,ERR=636) CONVAR(12)
0032            IF (CONVAR(12).LT.(2.8).OR.CONVAR(12).GT.(22.0)) GOTO 636
0034            GO TO 641
0035    636     WRITE (7,900)
0036            GO TO 631
                C
0037    640     FORMAT ('$ENTER ENLARGER SCALE READING IN INCHES = (xx.x) = ')
0038    641     WRITE (7,640)
0039            READ (5,635,ERR=646) CONVAR(13)
0040            IF (CONVAR(13).LT.(2.0).OR.CONVAR(13).GT.(33.0)) GOTO 646
0042            GO TO 647
0043    646     WRITE (7,900)
0044            GO TO 641

0045    647     CONTINUE                                                621.1
                C
0046            RETURN
0047            END 621.1
                C       THIS SUBROUTINE ENCODES CONVAR(13) FROM INTERNAL FORMAT TO
                C       CHARACTER FORMAT FOR TRANSMISSION TO THE RESTORATION UNIT.
                C
0001            SUBROUTINE TRMTCV
                C
                C
                C       DATA DECLARATIONS
                C
0002            INTEGER MTSTAT(4)
0003            LOGICAL*1 TARRAY(52)
0004            REAL CONVAR(13), DATOUT(5)
0005            COMMON CONVAR, DATOUT
```

```
0006            DATA MTSTAT/"17410,2*0,80/
        C
        C
        C       ENCODE DATA FROM INTERNAL FORMAT TO CHARACTER FORMAT
        C
0007    700     FORMAT (2A4,2F4.1,6F4.0,F4.2,2F4.1)
0008            ENCODE (52,700,TARRAY) CONVAR
        C
        C
        C       ATTACH TERMINAL AND TRANSMIT DATA TO RESTORATION UNIT
        C
0009            IEER = MTATCH (1)
0010            IEER = MTSET (1,MTSTAT)
0011            DO 750 J=1,52
0012            IERR = MTOUT (1,TARRAY(J))
0013    750     CONTINUE
        C
0014            RETURN
0015            END
```

```
                                                                621.1
        C       THIS SUBROUTINE RECIEVES CHARACTER DATA FROM THE RESTORATION UNIT
        C       AND DECODES THAT DATA FROM CHARACTER FORMAT TO INTERNAL FORMAT
        C       AND STORES THE DATA IN DATOUT(5).
        C
0001            SUBROUTINE RCVRDO
        C
        C
        C       DATA DECLARATIONS
        C
0002            LOGICAL*1 RARRAY(20)
0003            REAL CONVAR(13), DATOUT(5)
0004            COMMON CONVAR, DATOUT
        C
        C
        C       RECIEVE DATA FROM THE RESTORATION UNIT AND DETACH TERMINAL
        C
0005            DO 700 J=1,20
0006            IERR = MTIN (1,RARRAY(J))
0007    700     CONTINUE
0008            IERR = MTDTCH (1)
        C
        C
        C       DECODE DATA FROM CHARACTER FORMAT TO INTERNAL FORMAT
        C
0009    790     FORMAT (3F4.0,2F4.1)
0010            DECODE (20,790,RARRAY) DATOUT
        C
0011            RETURN
0012            END
```

FORTRAN IV      V02.04      Mon 12-Apr-82 00:00:00

RESTOR,RESTOR=RESTOR/O/U/L:1/N:4                                621.1

OPTIONS IN EFFECT:

SOURCE
        NOMAP
        NOCODE
        NOLEAPYEAR
        NOREADONLY
            LRECL=0136
        NOSTAT

```
                ISNS
                N0C0L80
                NOUSRSWAP
                NODIAGNOSE
                NOINTEGER*4
                  NLCHN=04
                N0DEBUG
                 VECTOR
                NOWARN
                  CODE:EIS
                   OPTIM:SIZ:CSE:STR:BND:PEP
                   LOG

0001            PROGRAM RESTOR                                           621.1
       C
       C        THIS PROGRAM RECIEVES DATA FROM THE EXPOSE PROGRAM, CHECKS FOR
       C        A PASSWORD AND AN EMBEDDED CONSTANT, AND IF THEY ARE CORRECT
       C        ALLOWS THE DATA TO BE PROCESSED BY AN ALGORITHM AND THE FINAL
       C        DATA TO BE TRANSMITTED BACK TO THE EXPOSE PROGRAM.
       C
       C
       C        DATA DECLARATIONS
       C
0002            REAL CONVAR(13), DATOUT(5), PASSWD(2)
0003            COMMON CONVAR, DATOUT
0004            DATA PASSWD/'SHAZ','ZAAM'/
       C
       C
       C        MAIN PROGRAM
       C
       C        GET DATA, CHECK PASSWORD AND CONSTANT, SKIP TO DATA OUT IF IN-
       C        VALID, ELSE PROCEED TO CALLING THE ALGORITHM.
       C
0005   100      CALL RCVRCV
0006            IF (CONVAR(1).NE.PASSWD(1).OR.CONVAR(2).NE.PASSWD(2)) GOTO 200
0008            IF (CONVAR(3).GT.(82.6).OR.CONVAR(3).LT.(82.4)) GOTO 200
0010            CALL ALGRTM
       C
       C
       C        OUTPUT DATA TO EXPOSE PROGRAM AND JUMP BACK TO CALL RCVRCV AND
       C        WAIT FOR NEW DATA STREAM.
       C
0011   200      CALL TRMTDO
0012            GOTO 100
       C
0013            END 621.1
       C        THIS SUBROUTINE RECIEVES CHARACTER DATA FROM THE EXPOSE PROGRAM
       C        DECODES IT FROM CHARACTER FORMAT TO INTERNAL FORMAT AND STORES
       C        THE DATA IN CONVAR(13)
       C
0001            SUBROUTINE RCVRCV
       C
       C
       C        DATA DECLARATIONS
       C
0002            INTEGER MTSTAT(4)
0003            LOGICAL*1 RARRAY(52)
0004            REAL CONVAR(13), DATOUT(5)
0005            COMMON CONVAR, DATOUT
0006            DATA MTSTAT/"17410,2*0,80/
       C
       C
       C        ATTACH TERMINAL AND RECIEVE DATA FROM THE EXPOSE PROGRAM
       C
0007            IERR = MTATCH (2)
```

```
0008            IERR = MTSET (2,MTSTAT)
0009            DO 600 J=1,52
0010            IERR = MTIN (2,RARRAY(J))
0011    600     CONTINUE
        C
        C
        C       DECODE DATA FROM CHARACTER FORMAT TO INTERNAL FORMAT
        C
0012    700     FORMAT (2A4,2F4.1,6F4.0,F4.2,2F4.1)
0013            DECODE (52,700,RARRAY) CONVAR
        C
0014            RETURN
0015            END
```

621.1

```
        C       THIS ROUTINE COMPUTES THE PRINT EXPOSURE TIME, FOR AN ENLARGER
        C       BASED ON HEIGHT, FOCAL LENGTH, F STOP, COLOR FILTRATION, AND
        C       PAPER CHARACHTERISTICS.
        C
        C
0001            SUBROUTINE ALGRTM
        C
        C
        C       DATA DECLARATIONS
        C
0002            REAL CONVAR(13), DATOUT(5), CF, FS, HT, MR, TIME
0003            COMMON CONVAR, DATOUT
        C
        C
        C
        C       MEANING OF VARIABLES USED IN THE ALGORITHM
        C
        C       CONVAR(4)  = ENLARGER OFFSET IN INCHES
        C       CONVAR(5)  = ENLARGER BRIGHTNESS CONSTANT
        C       CONVAR(6)  = FOCAL LENGTH OF ENLARGER LENS IN MILLIMETERS
        C       CONVAR(7)  = ANSI PAPER SPEED
        C       CONVAR(8)  = TOTAL CC UNITS OF YELLOW FILTRATION
        C       CONVAR(9)  = TOTAL CC UNITS OF MAGENTA FILTRATION
        C       CONVAR(10) = TOTAL CC UNITS OF CYAN FILTRATION
        C       CONVAR(11) = EXPOSURE CONSTANT FOR VARYING THE PRINT DENSITY
        C       CONVAR(12) = F STOP SETTING OF THE ENLARGER LENS
        C       CONVAR(13) = SCALE HEIGHT OF THE ENLARGER IN INCHES
        C       CF         = COMBINED EXPOSURE CORRECTION FOR COLOR FILTRATION
        C       FS         = SQUARE OF THE F STOP
        C       HT         = HEIGHT OF FILM PLANE ABOVE BASEBOARD IN MILLIMETERS
        C       MR         = EXPOSURE CORRECTION FOR MAGNIFICATION RATIO
        C       TIME       = CALCULATED EXPOSURE TIME
        C
        C
        C       REMOVES NUETRAL DENSITY FROM THE FILTER PACK BY SUBTRACTING THE
        C       LOWEST CC UNIT FILTER FROM THE TWO REMAINING FILTERS.
        C
0004            IF(CONVAR(8).LE.CONVAR(9).AND.CONVAR(8).LE.CONVAR(10))GOTO 800
0005            IF(CONVAR(9).LE.CONVAR(8).AND.CONVAR(9).LE.CONVAR(10))GOTO 810
0008            GOTO 820
0009    800     CONVAR(8) = 0.0
0010            CONVAR(9) = CONVAR(9) - CONVAR(8)
0011            CONVAR(10) = CONVAR(10) - CONVAR(8)
0012            GO TO 830
0013    810     CONVAR(8) = CONVAR(8) - CONVAR(9)
0014            CONVAR(9) = 0.0
0015            CONVAR(10) = CONVAR(10) - CONVAR(9)
0016            GO TO 830
0017    820     CONVAR(8) = CONVAR(8) - CONVAR(10)
0018            CONVAR(9) = CONVAR(9) - CONVAR(10)
```

```
0019            CONVAR(10) = 0.0
        C
        C
        C       ALGORITHM FOR COMPUTING EXPOSURE TIME
        C
                                                                    621.1
0020    830     CF = (1.0+.01*CONVAR(8))*(1.0+.2*CONVAR(9))*(1.0+.1*CONVAR(10))
0021            FS = CONVAR(12)*CONVAR(12)
0022            HT = 25.4*(CONVAR(4) + CONVAR(13))
0023            MR = (2*HT/(HT-SQRT(HT*(HT-CONVAR(6)*4.0))))**2.0
        C
0024            TIME = (CONVAR(11)*FS*MR*CF)/(CONVAR(5)*CONVAR(7))
        C
        C
        C       DATA IS STORED FOR TRANSMISSION IN ARRAY(5) DATOUT
        C
0025            DATOUT(1) = CONVAR(8)
0026            DATOUT(2) = CONVAR(9)
0027            DATOUT(3) = CONVAR(10)
0028            DATOUT(4) = CONVAR(12)
0029            DATOUT(5) = TIME
        C
0030            RETURN
0031            END

FORTRAN IV      V02.04      Mon 12-Apr-82 00:00:00              PAGE 001
                                                                621.1
        C       THIS SUBROUTINE ENCODES DATOUT(5) FROM INTERNAL FORMAT TO
        C       CHARACTER FORMAT AND TRANSMITS THE DATA TO THE EXPOSE PROGRAM.
        C
0001            SUBROUTINE TRMTDO
        C
        C
        C       DATA DECLARATIONS
        C
0002            LOGICAL*1 TARRAY(20)
0003            REAL CONVAR(13), DATOUT(5)
0004            COMMON CONVAR, DATOUT
        C
        C
        C       ENCODE DATA FROM INTERNAL FORMAT TO CHARACTER FORMAT
        C
0005    790     FORMAT (3F4.0,2F4.1)
0006            ENCODE (20,790,TARRAY) DATOUT
        C
        C
        C       TRANSMIT DATA TO THE EXPOSE PROGRAM AND DETATCH TERMINAL
        C
0007            DO 800 J=1,20
0008            IERR = MTOUT (2,TARRAY(J))
0009    800     CONTINUE
0010            IERR = MTDTCH (2)
        C
0011            RETURN
0012            END
```

What is claimed is:

1. The method of protecting and controlling a computer program, comprising the steps of:
   systematically invalidating said computer program in accordance with a predetermined invalidation procedure;
   making a recording of said systematically invalidated computer program on a storage device; and
   making a recording on another storage device of a restoration program for restoring said systematically invalidated computer program to its valid form.

2. The method of protecting and controlling a computer program, comprising the steps of:
   systematically invalidating said computer program in accordance with a predetermined invalidation procedure;

making a recording of said systematically invalidated computer program on a storage device; and making a recording on another storage device of a restoration program for execution withheld elements of the corresponding valid computer program.

3. The method of protecting and controlling a computer program, comprising the steps of:

systematically invalidating said computer program; and inserting into the systematically invalidated computer program at least one restoration instruction for instructing a restoration device to emit a corresponding part of a restoration program for restoring said invalidated program to its valid form;

wherein said corresponding part of a restoration program is a subprogram for modifying one or more parts of said invalidated program.

4. The method of protecting and controlling a computer program, comprising the steps of:

systematically invalidating said computer program; and inserting into the systematically invalidated computer program at least one restoration instruction for instructing a restoration device to emit a corresonding part of a restoration program for restoring said invalidated program to its valid form;

wherein said corresponding part of a restoration program is a subprogram for executing a withheld part of the corresponding valid computer program.

5. The method of protecting and controlling a computer program, comprising the steps of:

systematically invalidating said computer program; and inserting into the systematically invalidated computer program at least one restoration instruction for instructing a restoration device to emit a corresponding part of a restoration program for restoring said invalidated program to its valid form;

wherein said restoration instruction comprises an instruction for the insertion of a withheld element into said invalidated program at a predetermined location.

* * * * *